(12) United States Patent  (10) Patent No.: US 7,426,818 B2
Orsborn et al.  (45) Date of Patent: Sep. 23, 2008

(54) METHOD OF OPERATING COTTON ACCUMULATOR AND COMPACTOR

(75) Inventors: Jesse H. Orsborn, Birdsboro, PA (US); Michael J. Covington, Bettendorf, IA (US); Kevin S. Richman, Lititz, PA (US)

(73) Assignee: CNH America LLC, New Holland, PA (US)

( * ) Notice: Subject to any disclaimer, the term of this patent is extended or adjusted under 35 U.S.C. 154(b) by 147 days.

(21) Appl. No.: 11/476,268

(22) Filed: Jun. 28, 2006

(65) Prior Publication Data

US 2006/0242936 A1  Nov. 2, 2006

Related U.S. Application Data

(62) Division of application No. 11/055,794, filed on Feb. 11, 2005, now Pat. No. 7,162,856.

(60) Provisional application No. 60/557,852, filed on Mar. 30, 2004.

(51) Int. Cl.
  *A01D 46/08*  (2006.01)
(52) U.S. Cl. .......................................................... 56/28
(58) Field of Classification Search ...................... 56/30, 56/28, 346; 100/177, 178, 88; 298/11, 18; 414/505; 460/119
  See application file for complete search history.

(56) References Cited

U.S. PATENT DOCUMENTS

| | | | |
|---|---|---|---|
| 3,733,798 A | 5/1973 | Garrison | 56/350 |
| 3,768,679 A | 10/1973 | Lundahl | 214/519 |
| 3,886,719 A | 6/1975 | Garrison et al. | 56/344 |
| 4,553,378 A | 11/1985 | Fachini et al. | 56/16.6 |
| 4,744,207 A * | 5/1988 | Hanley et al. | 56/16.6 |
| 4,930,297 A * | 6/1990 | Schlueter et al. | 56/16.6 |
| 5,407,390 A * | 4/1995 | Carney et al. | 460/119 |
| 5,427,572 A | 6/1995 | Deutsch et al. | 460/119 |
| 5,533,932 A * | 7/1996 | Covington et al. | 460/119 |
| 5,584,762 A * | 12/1996 | Buhler et al. | 460/119 |
| 6,032,446 A | 3/2000 | Gola et al. | 56/341 |
| 6,176,779 B1 * | 1/2001 | Riesterer et al. | 460/119 |
| 6,208,259 B1 * | 3/2001 | Lemke | 340/665 |
| 6,262,650 B1 | 7/2001 | Deutsch et al. | 56/16.4 B |
| 6,366,210 B2 * | 4/2002 | Lemke | 340/665 |
| 6,421,992 B1 | 7/2002 | Goering et al. | 56/28 |
| 6,530,199 B1 * | 3/2003 | Covington et al. | 56/16.6 |
| 6,536,197 B1 * | 3/2003 | Covington et al. | 56/28 |
| 6,553,902 B2 | 4/2003 | Leupe et al. | 100/45 |

\* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A cotton receiver for a cotton harvesting machine and a method of operation of the same. The receiver includes a cotton compacting chamber, a precompacting area above the chamber, and an accumulator deployable upwardly from the precompacting area to increase the cotton holding capacity thereof. Compactor apparatus is located in the compacting chamber and is configured for holding cotton thereabove separate from cotton therebelow. the compactor apparatus is movable downwardly against cotton therebelow for compacting it into a unitary body or module, including while holding cotton thereabove, and is controllably operable for conveying cotton held thereabove downwardly therethrough, subsequent to unloading a completed compacted body of cotton.

2 Claims, 3 Drawing Sheets

METHOD OF OPERATING COTTON ACCUMULATOR AND COMPACTOR

This application claims the benefit of U.S. Provisional Application No. 60/557,852, filed Mar. 30, 2004, and to U.S. patent application Ser. No. 11/055,794 filed Feb. 11, 2005 from which this application claims priority as a divisional application now U.S. Pat. No. 7,162,856.

TECHNICAL FIELD

This invention relates generally to cotton harvesting machines including a cotton receiver for receiving and holding harvested cotton, and more particularly, to an expandable accumulator for a cotton receiver, which can be deployed to increase the capacity of a precompacting area of the receiver, and which can be folded or stored when not in use.

BACKGROUND ART

Commonly, cotton harvesting machines can unload harvested cotton into a container such as a trailer known as a boll buggy in the field, while remaining in the rows for harvesting the cotton plants. Essentially, a boll buggy is a container open on the top that is pulled by a tractor or other vehicle up to the cotton harvesting machine while in the field. The harvesting machine can be stopped and the boll buggy pulled alongside the cotton receiver, and the cotton in the receiver unloaded into the boll buggy. The cotton harvesting machine can then resume harvesting and the boll buggy is typically transported to a standard module builder located in an accessible location such as the end of the rows, and unloaded. As a result, the harvesting machine does not have to come out of the rows to unload when full. Newer cotton harvesting machines which compact and form or package the cotton into a unitary body or module as the cotton is conveyed into a cotton receiver on the machine, are typically required to unload the cotton module or compacted body of cotton at the end of the rows, or a location where the module or compacted body of cotton can be picked up by a module truck or the like for transport to the gin for processing. The end of the rows provides a suitable location, as the terrain is typically relatively level. It is undesirable to unload a module or compacted body of cotton in the field, as the field contains stalks and the ground is uneven as a result of being formed into raised beds for the plants.

A typical modern cotton harvesting machine with an on-board module building and/or packaging capability can produce a compacted module or body of cotton that can weigh between about 8,000 and about 11,000 pounds, depending upon crop conditions. Conventional cotton harvesting machines typically can hold a maximum of about 10,500 pounds. This large capacity allows both machines to make one or more passes in the field depending on row length and yield (pounds of cotton per acre). Conventional cotton harvesting machines can unload at any time, either in the field into a boll buggy, or at the end of the rows by driving up to a module maker and unloading the cotton into it. In contrast, for maximum efficiency, a cotton harvesting machine which can package or compact cotton into a unitary module or body, is desirably unloaded when the module or body is completely formed. Partial modules or bodies should only be unloaded when finishing up a field, and these should still be unloaded at the end of the rows in what is known as the turn row where the cotton harvesting machine turns around to enter new rows for harvesting the cotton therefrom Therefore, because of widely varying row lengths and yield conditions, there is a need for cotton harvesting machines to have the capability to hold cotton above the compactor apparatus to allow the operator to continue to harvest cotton until the end of a swath of rows or other suitable location for unloading, is reached.

Therefore, what is sought is apparatus and a method which overcomes the problems and provides the capability set forth above.

SUMMARY OF THE INVENTION

What is disclosed is a cotton accumulator for the cotton receiver of a harvesting machine, capable of receiving and holding harvested cotton at a location separate from that in which the cotton is compacted or otherwise formed into a unitary body or module, and then, after a compacted body or module of cotton is unloaded, will allow the collected cotton to fall or be conveyed into the lower compacting region for formation by compactor apparatus into the next compacted body or module.

The accumulator will preferably have a capability to be movable between a deployed position providing the sought after cotton holding capacity, and a stored position when not in use and for transport. The accumulator is preferably located in association with the upper region of the cotton receiver, in a precompacting area above the compactor apparatus, such that the compactor apparatus can serve to hold the cotton in the accumulator as compacted cotton in the receiver already is compacted or formed into a unitary body or module can be completed and unloaded. The accumulator can be moved between its deployed and stored positions using any suitable apparatus, such as one or more drivers, such as a fluid cylinder, winch, or mechanical actuator. The accumulator can also be moved between its positions by movement of the compactor apparatus, which can be of conventional, well known construction. The accumulator can be deployed manually, by operator action, or automatically, as desired or required.

DETAILED DESCRIPTION OF THE INVENTION

Figure 1:
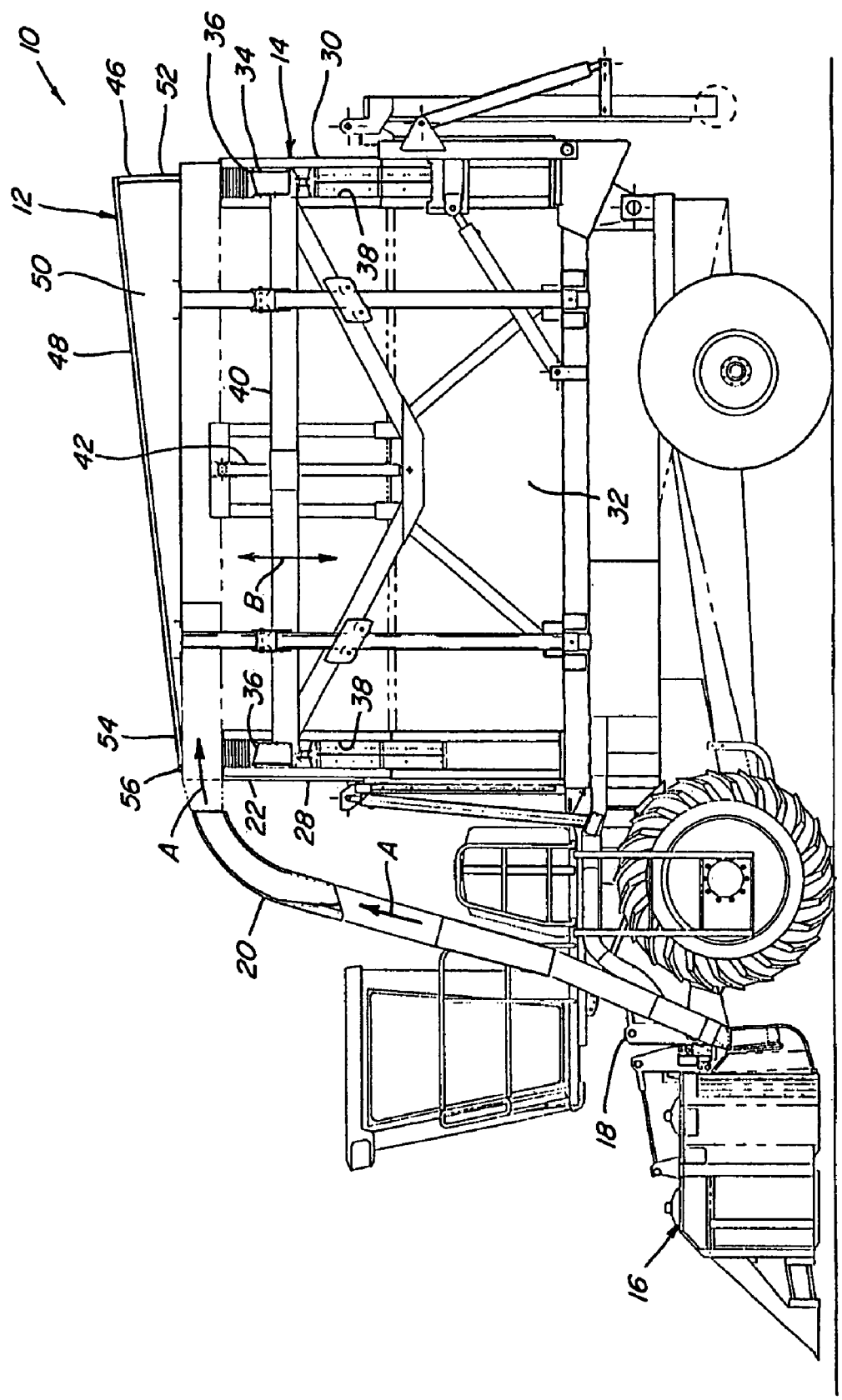
FIG. 1 is a side view of a cotton harvesting machine including a cotton accumulator in a deployed position according to the invention.

Referring now to the drawings, in FIG. 1 a cotton harvesting machine 10 is shown, including a cotton accumulator 12 constructed and operable according to the teachings of the present invention on a cotton receiver 14 of the machine. Harvesting machine 10 includes a plurality of harvesting units 16 arranged in an array across a forward end 18 of machine 10 for harvesting cotton from plants as machine 10 is moved in the forward direction along rows of the plants (not shown). The harvested cotton is conveyed by air flows through an array of ducts 20 extending upwardly and rearwardly from units 16 to a precompacting area 22 of cotton receiver 14, as denoted by arrows A, in the well known conventional manner.

Figure 2:
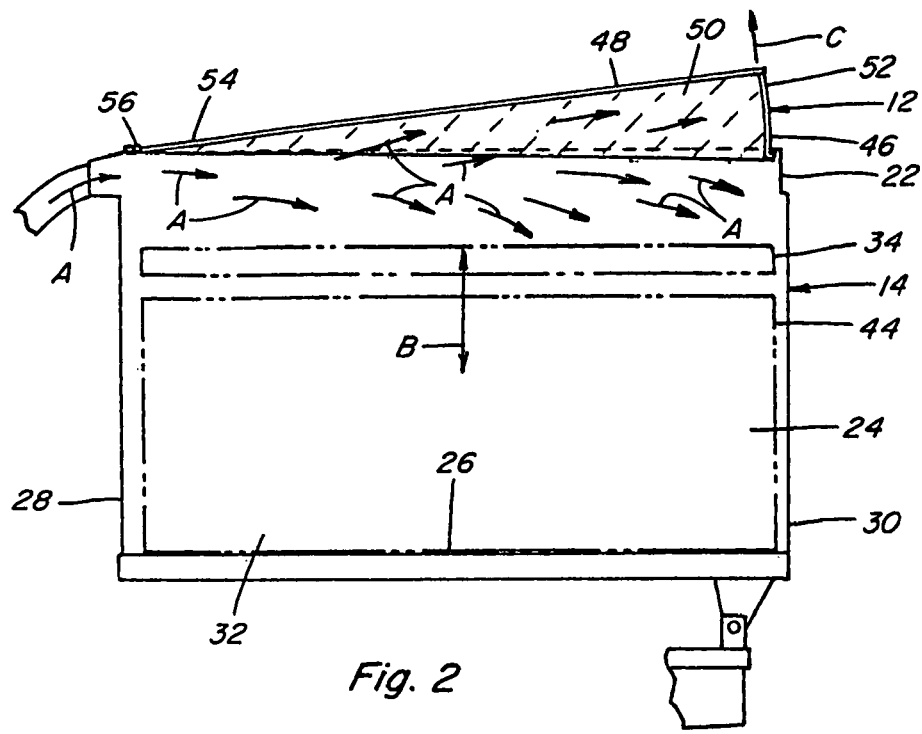
FIG. 2 is a simplified side view of a cotton receiver of the machine of FIG. 1, showing the accumulator in its deployed position above a cotton receiver of the machine and the flow of cotton therein.
Figure 3:
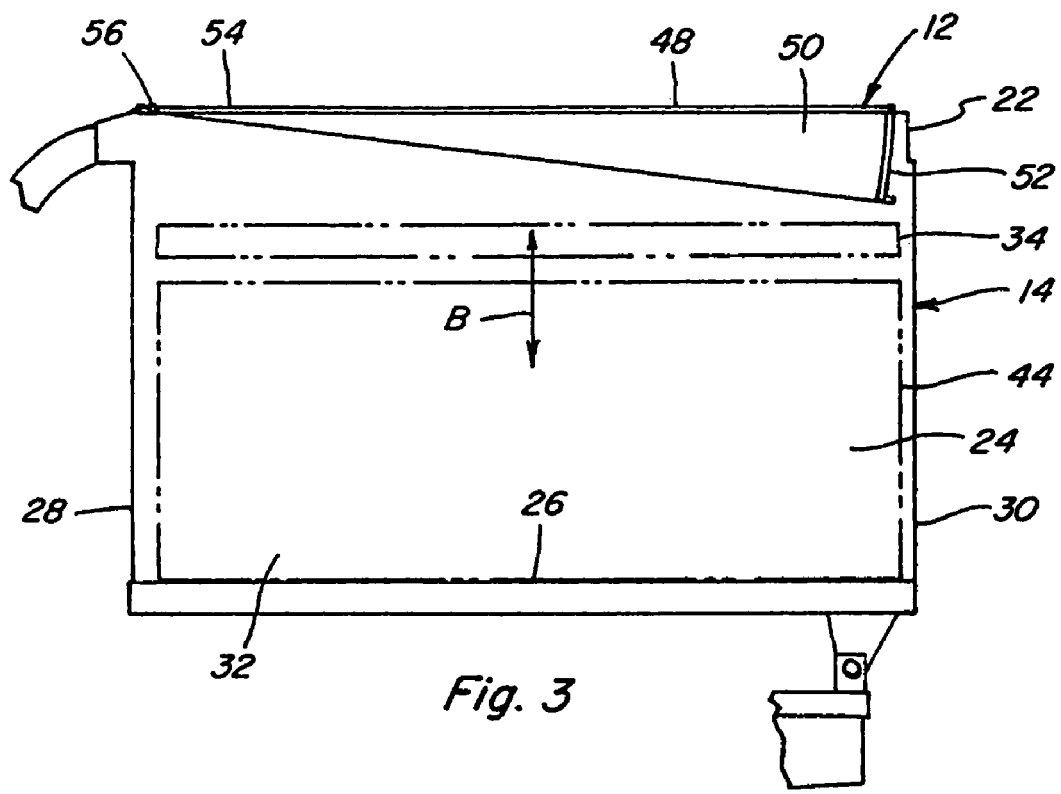
FIG. 3 is another simplified side view of the cotton receiver, showing the accumulator in its stored position.
Figure 4:
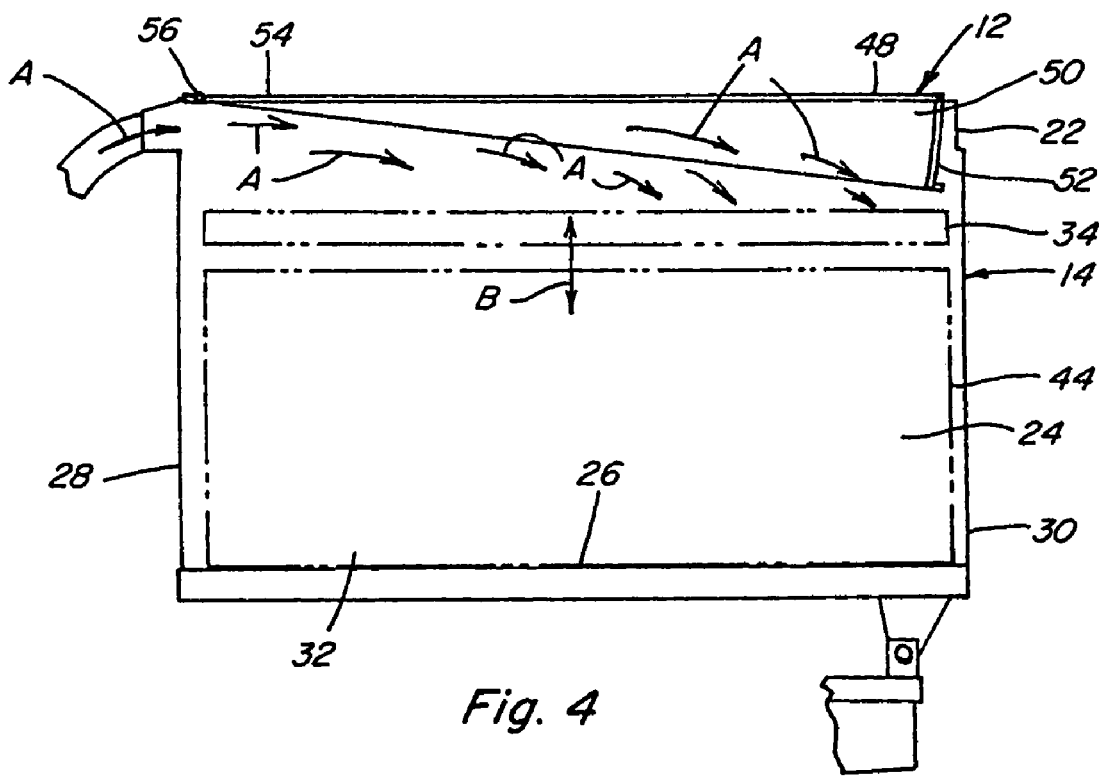
FIG. 4 is another simplified side view of the receiver with the accumulator in its stored position, showing airborne conveyance of cotton into the interior of the receiver.

Referring also to FIGS. 2, 3 and 4, cotton receiver 14 is shown. Cotton receiver 14 is a structure of rectangular shape, including an interior compacting chamber 24 defined by a floor 26, forward and rearward end walls 28 and 30, and opposing side walls including a side wall 32 shown. End walls 28 and 30, and the side walls including side wall 32, extend upwardly from floor 26 to precompacting area 22 which defines a generally upwardly facing opening, which is occupied and enclosed by cotton accumulator 12. Cotton accumulator 12, end walls 28 and 30, and the side walls are preferably constructed of an air permeable material, such as a mesh or perforated sheeting having holes or openings therein adequate for dissipation of air flow therethrough, but which will retain the cotton conveyed into compacting chamber 24 as denoted by arrows A.

Compactor apparatus 34 is shown in the upper region of interior compacting chamber 24. Compactor apparatus 34 includes side-to-side extending cross bars 36 adjacent end walls 28 and 30 which extend through vertical slots 38 through the side walls, including side wall 32, and are supported by a support structure 40, including a pair of fluid cylinders 42 located beside the side walls, for moving compactor apparatus 34 upwardly and downwardly within chamber 24, as denoted by arrow B in each of the figures. A substantially complete compacted body of cotton or module 44 is shown in each of FIGS. 2, 3 and 4 for illustration of usage of accumulator 12. Essentially, in operation, as cotton denoted by arrows A is conveyed into interior chamber 24, compactor apparatus 34 will be operated to move in the upward and downward direction denoted by arrow B, against the collected cotton to compact the cotton against floor 26 to gradually build a compacted body or module as represented by module 44. As explained above, a completed compacted cotton module such as module 44 can have a weight of between about 8,000 and 11,000 pounds, and will be relatively large, having dimensions corresponding to those of compacting chamber 24. It is an important objective of the use of compacting apparatus such as apparatus 34 and the making of compacted bodies and modules of cotton, such as module 44, to reduce manpower and handling, and facilitate transport of the cotton from the field to the gin for processing. Currently, compacted bodies of cotton, such as module 44, are preferably unloaded from machines, such as harvesting machines 10, on a level surface, such as the ground at the end of the rows of a cotton field, to facilitate picking up and loading the cotton onto trucks used for transporting it. Cotton fields usually include rows of raised beds separated by spaces or channels for carrying irrigation water, and after picking typically include stubble and/or intact plants, which make an undesirable surface onto which to unload a compacted body or module of cotton, as it would greatly inhibit pickup and loading onto a transport truck. As a result, it is desirable to limit unloading to times when machine 10 has completed a swath of rows of cotton, at the turn row where the machine is turned around to proceed along a new swath of rows through the field. However, it has been often found that the interior compacting chamber such as chamber 24 of machine 10 will be filled, and/or a compacted body or module such as module 44 completed, before the end of the rows is reached. This is a problem as without extra cotton carrying capacity, the harvesting operation must be interrupted, the machine moved to a suitable unloading location, unloaded, and returned to the harvesting operation, or the completed module unloaded at an undesirable location in the field.

Cotton accumulator 12 overcomes the problems and shortcomings set forth above by providing added cotton receiving capacity to precompacting area 22 of cotton receiver 14. In FIGS. 1 and 2, cotton accumulator 12 is shown in a deployed position with a rearward end 46 thereof extended upwardly, denoted by arrow C in FIG. 2, for increasing the interior volume of precompacting area 22 above compactor apparatus 34 for receiving cotton conveyed therein as denoted by arrows A, the cotton being held above module 44 by the compactor apparatus 34. As a result, the harvesting operation can continue and the harvesting machine moved to a convenient and suitable unloading location such as the end of the rows being harvested, without interruption of the harvesting process. Then, after the body of cotton or module, such as module 44 is unloaded, the cotton collected in accumulator 12 above compactor apparatus 34 can be allowed to fall into, or be moved or conveyed into, the lower portion of chamber 24 for compaction into a compacted body or module in the above-described manner. Here, it should be noted that compactor apparatus such as apparatus 34 will typically include one or more rotatable augers capable of conveying cotton on top of apparatus 34 into the compacting chamber located therebelow, as is well known in the art. Such augers can be actuated to convey the cotton from accumulator 12 into the lower region of the chamber.

The embodiment of cotton accumulator 12 can have a variety of interior capacities, as required or desired for a particular application. The capacity of accumulator 12 shown is illustrated by dotted crosshatching and is shown having a triangular or wedge sectional shape, but could likewise have other shapes including a more rectangular shape, or a more curved or rounded shape. Accumulator 12 is shown in FIGS. 3 and moved downwardly to a stored position contained at least substantially within precompacting area 22 of receiver 14 when its use is not required. As shown in FIG. 4, in this position, cotton can be conveyed into receiver 14 in the conventional manner as denoted by arrows A for compaction by compactor apparatus 34. The illustrated embodiment of accumulator 12 has an upper wall 48 which is generally flat and covers the forward-to-rearward and side-to-side extent of accumulator 12. Accumulator 12 includes a pair of side walls extending downwardly from upper wall 48, as illustrated by side wall 50, the side walls having a wedge shape which tapers divergently in the rearward direction. A rearward end wall 52 extends between upper wall 48 and the side walls including side wall 50 for enclosing the rearward end of accumulator 12. Side walls 50 and end wall 52 can be of suitable construction, for holding cotton, including of a suitable mesh material or sheet material including holes therethrough for the passage of air but not the cotton, or of an alternative material including a solid sheet metal, or the like. Accumulator 12 has a forward end 54 which in this embodiment is pivotally connected to a forward end of receiver 14 in a suitable manner, for instance, by one or more hinges 56 to allow movement of accumulator 12 between its deployed and stored positions. Suitable seals can be provided as required between the lower periphery of accumulator 12 and walls 28, 30 and 32.

Figure 5:
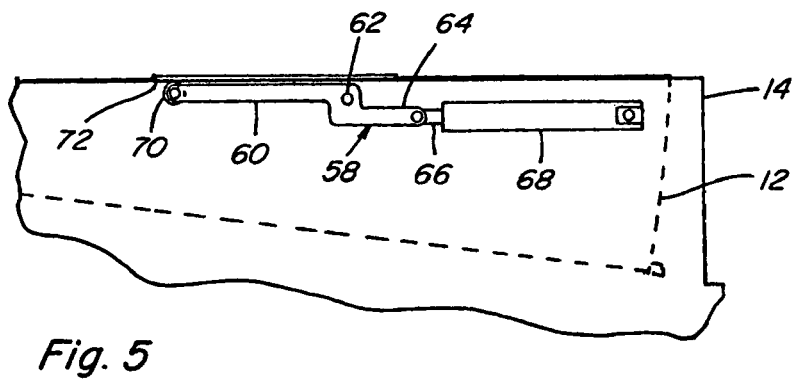
FIG. 5 is a fragmentary side view of the receiver, showing the accumulator in its stored position, and a representative mechanism for moving the accumulator between its stored position and deployed position.
Figure 6:
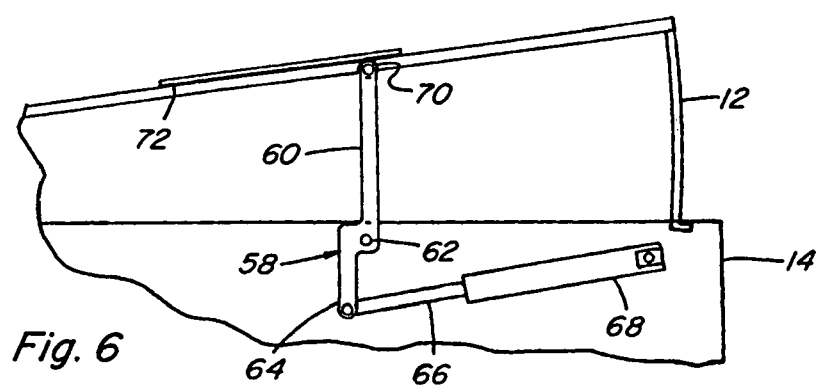
FIG. 6 is another fragmentary side view of the receiver showing the accumulator moved to its deployed position by the mechanism of FIG. 5.

Accumulator 12 can be manually moved between its deployed and stored positions, or automatically moved using a suitable actuator or mechanism such as one or more fluid cylinders, a winch, or the like. FIGS. 5 and 6 illustrate one exemplary embodiment of a mechanism 58 for moving accumulator 12 between its stored position (FIG. 5) and its deployed position (FIG. 6). Mechanism 58 includes an arm 60 mounted by pivot 62 to the side of receiver 14. Arm 60 includes a first end portion 64 pivotally connected to a rod 66 of a fluid cylinder 68, and an opposite end portion 70 including a roller which contacts a downwardly facing surface of a plate 72 mounted along the side edge of accumulator 12. Fluid cylinder 68 is pivotally connected to the side of cotton receiver 14 and when extended will pivot arm 60 about pivot 62 to pivotally move accumulator 12 about hinge 56 to the deployed position as shown in FIG. 6. Similarly, when fluid cylinder 68 is retracted, arm 60 will be pivoted in the opposite direction to move accumulator 12 to its stored position as shown in FIG. 5. Here, it should be noted that mechanism 58 is but one of any number of mechanisms that could be utilized for moving accumulator 12 between its deployed and stored positions, and therefore is in no way to be considered as limiting.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of operation of a mobile cotton harvesting machine, comprising steps of:

providing a cotton receiver on the machine including a cotton compacting chamber having a forward end and a rearward end, a precompacting area above the compacting chamber for receiving harvested cotton, and an accumulator having one end pivotally mounted to the forward end of the compacting chamber to allow movement of the accumulator between a normally stored position and a deployed position, wherein the accumulator is deployable upwardly from the precompacting area for increasing an interior volume thereof;

providing compactor apparatus supported in the compacting chamber, the compactor apparatus being configured and having an extent only marginally smaller than an extent of the compacting chamber so as to be operable for holding cotton in the precompacting area above the compacting chamber, and so as to be capable of being driven downwardly against cotton accumulated in a lower portion of the compacting chamber for compacting the accumulated cotton into a unitary body, the compactor apparatus including at least one auger operable for conveying cotton held above the compactor apparatus downwardly therethrough and into the compacting chamber;

providing support structure supporting the compactor apparatus for reciprocal movement downwardly against cotton accumulated in the compacting chamber and upwardly therefrom;

raising the accumulator upwardly from the stored position to the deployed position:

while harvesting cotton, periodically operating the at least one auger for conveying cotton received into the precompacting area into the compacting chamber, and periodically driving the compactor apparatus downwardly to compact the cotton in the compacting chamber so as to form a unitary body of compacted cotton therein;

when the unitary body of compacted cotton reaches a predetermined size and while continuing harvesting cotton, then ceasing operation of the at least one auger so as to hold substantially all of any cotton which subsequently comes into the precompacting area above the compactor apparatus separate from the unitary body of compacted cotton;

ceasing harvesting cotton and unloading the unitary body of compacted cotton; and after unloading the body of compacted cotton, operating the at least one auger to convey the collected cotton that was stored in the precompacting area into the compacting chamber.

2. The method of claim 1, comprising the further step of:

lowering the accumulator downwardly from the deployed position to the stored position.

* * * * *